United States Patent
Yee et al.

(10) Patent No.: US 11,847,658 B2
(45) Date of Patent: *Dec. 19, 2023

(54) CROWDSOURCED ANNOTATION AND TAGGING SYSTEM FOR DIGITAL TRANSACTIONS

(71) Applicant: Capital One Services, LLC, McLean, VA (US)

(72) Inventors: Bryant Yee, Washington, DC (US); Mykhaylo Bulgakov, Arlington, VA (US); George Leon Bergeron, IV, Falls Church, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 338 days.

This patent is subject to a terminal disclaimer.

(21) Appl. No.: 17/010,141

(22) Filed: Sep. 2, 2020

(65) Prior Publication Data

US 2021/0027303 A1    Jan. 28, 2021

Related U.S. Application Data

(63) Continuation of application No. 16/519,463, filed on Jul. 23, 2019, now Pat. No. 10,803,464.

(51) Int. Cl.
*G06Q 20/42*        (2012.01)
*G06Q 20/04*        (2012.01)
*G06F 40/169*       (2020.01)

(52) U.S. Cl.
CPC ........... *G06Q 20/42* (2013.01); *G06F 40/169* (2020.01); *G06Q 20/0425* (2013.01)

(58) Field of Classification Search
CPC .............................. G06Q 40/00; G06Q 30/02
See application file for complete search history.

(56) References Cited

U.S. PATENT DOCUMENTS

| | | | |
|---|---|---|---|
| 8,495,489 B1 * | 7/2013 | Everingham | G06Q 30/02 707/913 |
| 9,092,773 B2 | 7/2015 | Daly et al. | |
| 2015/0032615 A1 | 7/2015 | Blackhurst et al. | |
| 2015/0193866 A1 | 7/2015 | Van Heerden et al. | |
| 2016/0125317 A1 | 5/2016 | Benjamin | |

OTHER PUBLICATIONS

International Search Report and Written Opinion in related application No. PCT/US2021/050374 dated Dec. 16, 2021.
International Preliminary Report on Patentability in related application No. PCT/US2021/050374 dated Apr. 13, 2023.

* cited by examiner

*Primary Examiner* — Ojo O Oyebisi
(74) *Attorney, Agent, or Firm* — TROUTMAN PEPPER HAMILTON SANDERS LLP; Christopher J. Forstner; John A. Morrissett

(57) ABSTRACT

A system for crowdsourcing annotations for transactions includes a crowdsourcing annotation database and a processor. The database stores crowdsourced annotations associated with merchants. The crowdsourced annotations are shared among, and contributed by, users of a community. The processor receives transaction data for a transaction by a user with a merchant. Relevant crowdsourced annotations associated with the merchant are retrieved from the database and sent to the user to enable to the user to annotate the transaction. The user provides an annotation for the transaction. The system dynamically updates the database based on the annotation provided by the user.

20 Claims, 13 Drawing Sheets

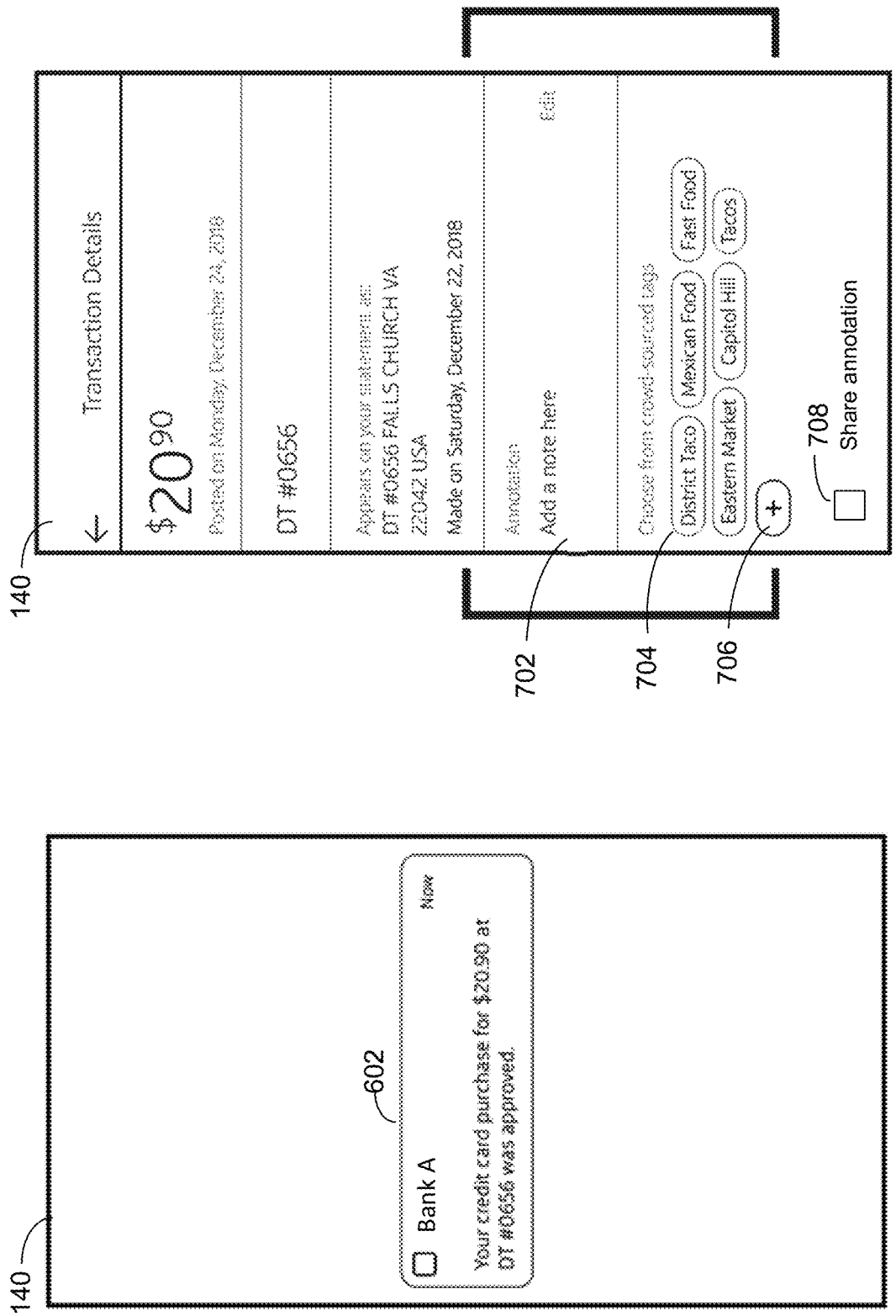

FIG. 14

CROWDSOURCED ANNOTATION AND TAGGING SYSTEM FOR DIGITAL TRANSACTIONS

CROSS-REFERENCE TO RELATED APPLICATIONS

This application is a continuation of, and claims priority under 35 U.S.C. § 120 to, U.S. patent application Ser. No. 16/519,463, filed Jul. 23, 2019, the entire contents of which are fully incorporated herein by reference.

FIELD

The presently disclosed subject matter relates generally to crowdsourcing annotations for transactions, and more particularly to systems and methods creating a collaboration environment for users to crowdsource transaction annotations and automatically annotate new transactions based on crowdsourced annotations.

BACKGROUND

Oftentimes, when people look back at their financial statements, such as bank account transaction history, credit or debit card transaction history, they are perplexed by ambiguous merchant identifiers that appear on their statements. They may not be able to recall the nature of the transactions based on the merchant identifiers alone. Some ambiguous merchant identifiers may also appear suspicions. There is a need for a system to crowdsource annotations in a manner such that the system allows users to enter customized annotations or tags for transactions and share annotations with other users. There is also a need for a system that can automatically recognize any incoming transaction and provide accurate transaction annotations or tags based on historical entries provided by users. Embodiments of the present disclosure are directed to this and other considerations.

SUMMARY

Aspects of the disclosed technology include systems and methods for crowdsourcing annotations for transactions. Consistent with the disclosed embodiments, a system includes one or more processors and a memory. The memory includes a crowdsourcing annotation database. The database stores a plurality of crowdsourced annotations associated with a plurality of merchants. The crowdsourced annotations are shared among, and contributed by, a plurality of users. The crowdsourced annotations include a plurality of annotations associated with a first merchant obtained from past transactions with the first merchant. The processor receives, from a first user device, first transaction data for a first transaction by a first user with the first merchant. The processor retrieves from the memory one or more relevant crowdsourced annotations associated with the first merchant. The processor sends to the first user device a first signal to cause the first user device to display the one or more relevant crowdsourced annotations to the first user to enable the first user to annotate the first transaction. The processor receives from the first user device a first annotation for the first transaction. The processor dynamically updates the crowdsourcing annotation database based on the first annotation.

Another aspect of the disclosed technology relates to a system for detecting fraud transactions based on crowd-sourced annotations. The system includes a non-transitory storage medium and a processor. The non-transitory storage medium includes a crowdsourcing annotation database. The database stores a plurality of crowdsourced annotations associated with a plurality of merchants obtained from past transactions with the merchants. The crowdsourced annotations are shared among and contributed by a plurality of users. The processor receives transaction data indicating a first transaction by a first user with a first merchant. The processor identifies from the non-transitory storage medium any crowdsourced annotation associated with the first merchant. The processor determines legitimacy of the first transaction based on the identified crowdsourced annotation associated with the first merchant. The processor determines that the first transaction is fraudulent when the identified crowdsourced annotation indicates that past transactions with the first merchant fail to meet a confidence threshold. The processor determines that the first transaction is legitimate when the identified crowdsourced annotation indicates that the past transactions with the first merchant meet the confidence threshold. The determined legitimacy of the first transaction is displayed to the first user.

A further aspect of the disclosed technology relates to a system for crowdsourcing annotations for transactions. The system includes a non-transitory storage medium and a processor. The non-transitory storage medium stores a crowdsourcing annotation database. The database stores a plurality of crowdsourced annotations associated with a plurality of transactions. The crowdsourced annotations are shared among and contributed by a plurality of users. The processor receives an image of a check from a user indicating a first transaction. The processor identifies text on the check based on recognition of the image. The processor automatically generates one or more annotations associated with the check based on the identified text. The processor dynamically updates the crowdsourcing annotation database based on the automatically generated one or more annotations associated with the check.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 6 is an example screenshot of a graphical user interface of the user device displaying a transaction notification according to one aspect of the disclosed technology.

FIG. 7 is an example screenshot of the graphical user interface of the user device displaying crowdsourced annotations according to one aspect of the disclosed technology.

FIG. 14 is an example screenshot of the graphical user interface of the user device displaying past transactions associated with a specific annotation according to one aspect of the disclosed technology.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
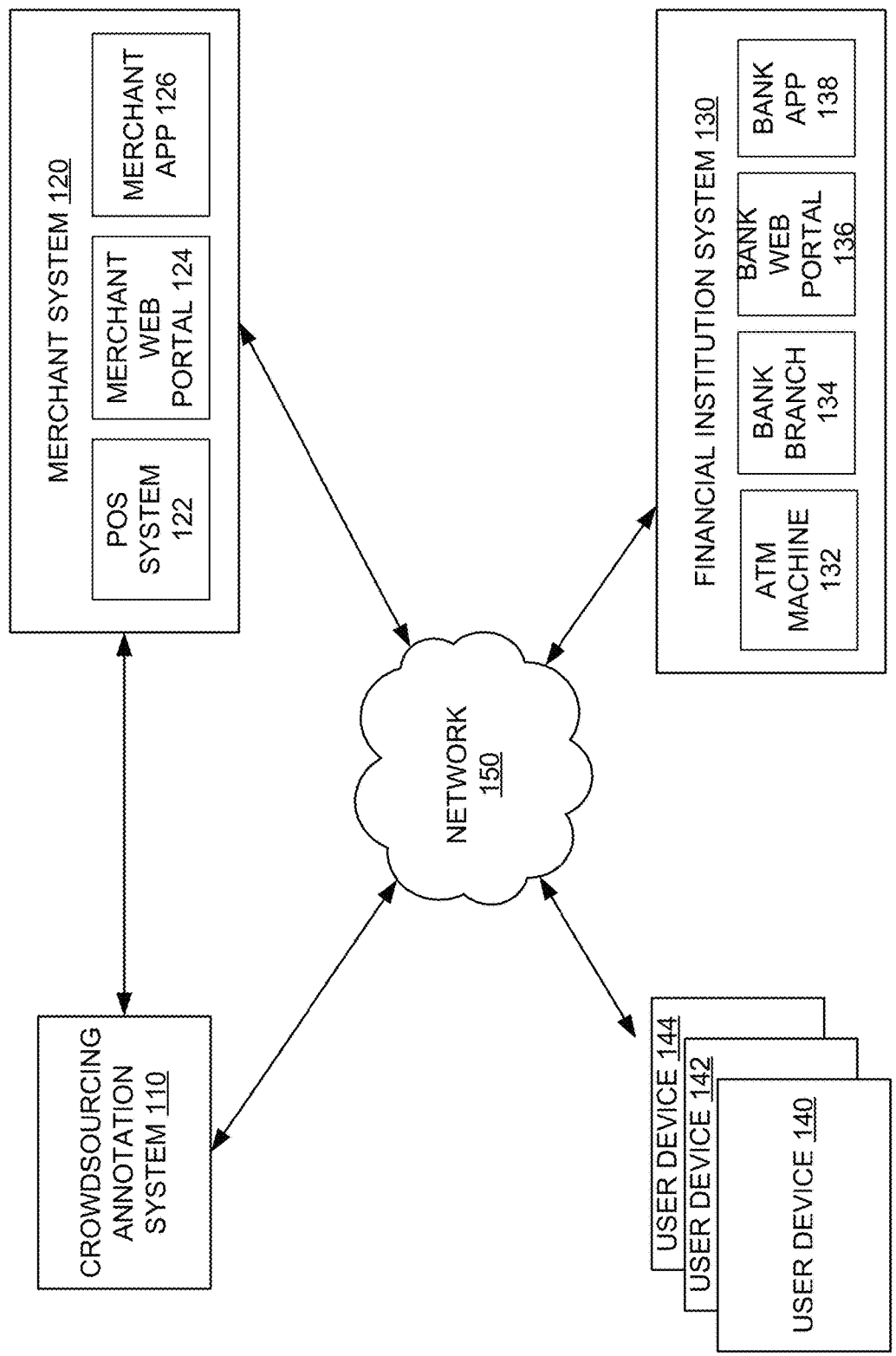
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 may include one or more of the following: one or more crowdsourcing annotation systems 110, one or more merchant systems 120, one or more financial institution systems 130, one or more user devices 140-144, and one or more networks 150.

The merchant system 120 may include one or more of the following: a point of sale (POS) system 122, a merchant web portal 124, and a merchant app 126, among other possibilities. The financial institution system 130 may include one or more of the following: an ATM machine 132, a bank branch 134, a bank web portal 136 and a bank app 138, among other possibilities. In one embodiment, the crowdsourcing annotation system 110 may belong to the financial institution system 130. In another embodiment, the crowdsourcing annotation system 110 may be independent of the financial institution system 130. Each user device 140 may include, but not limited to, a mobile device, a tablet, and a personal computer, among other possibilities.

The crowdsourcing annotation system 110 may annotate transaction data with custom notes, descriptions and tags, which may collectively be referred to as annotations. Such transaction data may include credit or debit card transaction data and checking or saving transaction data. In one embodiment, each annotation may annotate the merchant. The crowdsourcing annotation system 110 may allow users to submit these annotations, aggregate user-generated annotations, and parse annotations by machine learning algorithms build a crowdsourcing annotation database 320. The crowdsourcing annotation system 110 may use machine learning algorithms to analyze the annotations provided by the users. The crowdsourcing annotation system 110 may use machine learning algorithms to extrapolate common themes among similar transactions by different users. Each common theme may be regarded as an annotation for the transaction. The crowdsourcing annotation system 110 may crowdsource appropriate annotations for each transaction or merchant. The crowdsourcing annotation system 110 may automatically generate annotations for new transactions to facilitate users' understanding of the new transactions.

For example, the crowdsourcing annotation system 110 may collect annotations submitted by users for transactions conducted with a merchant. When a next user conducts a next transaction with the same merchant, the system 110 may automatically provide to the user one or more of the annotations previously submitted by users who have transacted with the same merchant. In one embodiment, the next user may be one of the users who have previously submitted the annotations. In another embodiment, the next user may be someone who has not submitted any annotation.

The crowdsourcing annotation system 110 may store one or more annotations associated with each transaction and/or each merchant. The crowdsourcing annotation system 110 may allow users to effectively search their transaction history and analyze their spending habits by searching for transactions or merchants associated with one or more given annotations.

The crowdsourcing annotation system 110 may interact with any users, such as collecting or displaying annotations associated with transactions, through an app, a website, or a financial local branch, among other possibilities. Users may submit transaction annotations through the app, website or the local branch. Users may opt to share the submitted annotations with other users. In some embodiments, the crowdsourcing annotation system 110 may automatically annotate a new transaction based on existing crowdsourced annotations for same or similar transactions, without requiring any user input for any new transaction. The user may be given an option to modify any annotation automatically selected by the crowdsourcing annotation system 110.

Figure 2:
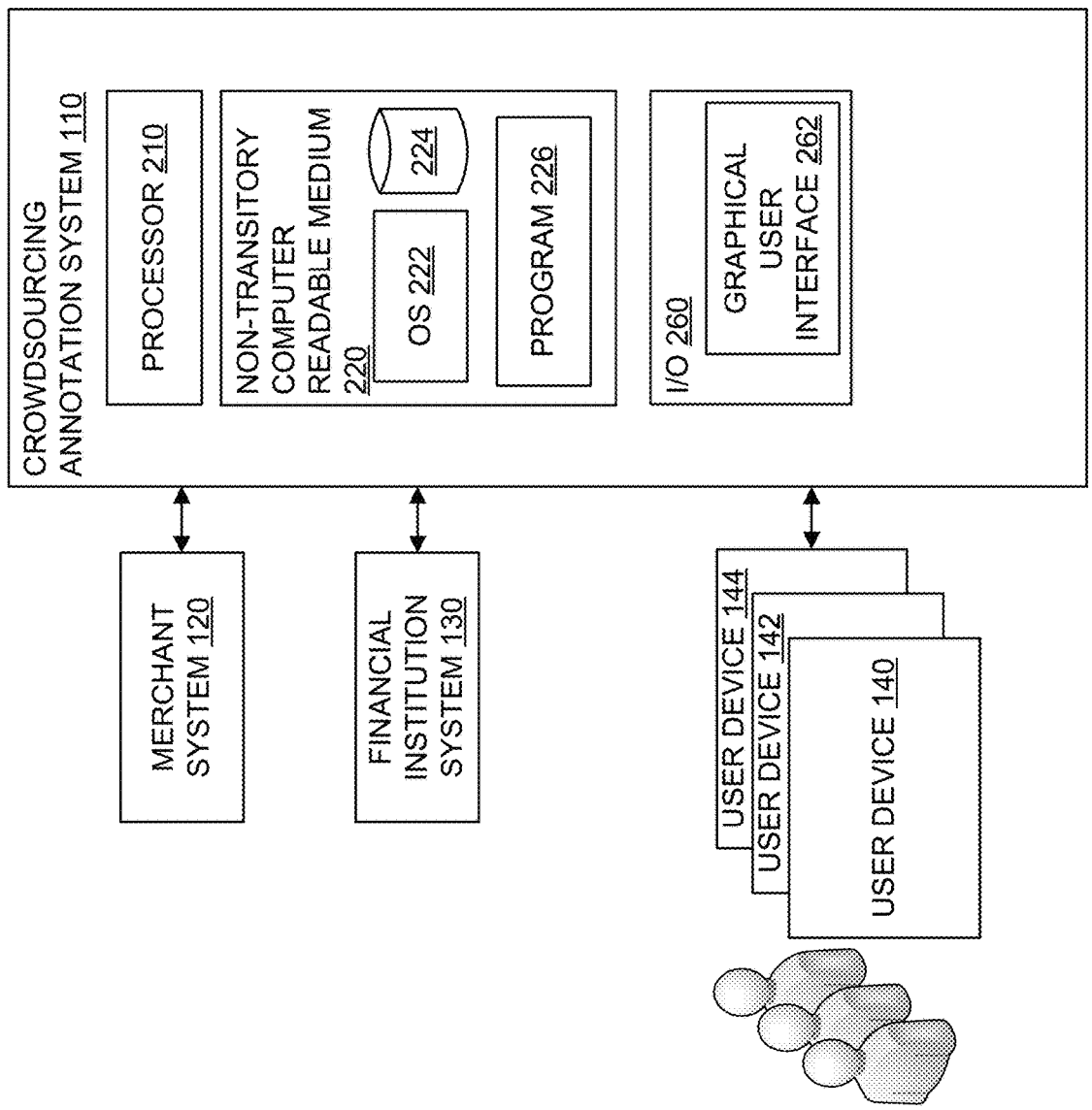
FIG. 2 is an example block diagram illustrating communications among a crowdsourcing annotation system, a merchant system, a financial institution system and user devices according to one aspect of the disclosed technology.

Turning to FIG. 2, the crowdsourcing annotation system 110 may include one or more of the following: a processor 210, a non-transitory computer readable medium 220, and an input/output ("I/O") device 260, among other possibilities. The I/O device 260 may include a graphical user interface 262.

Figure 3:
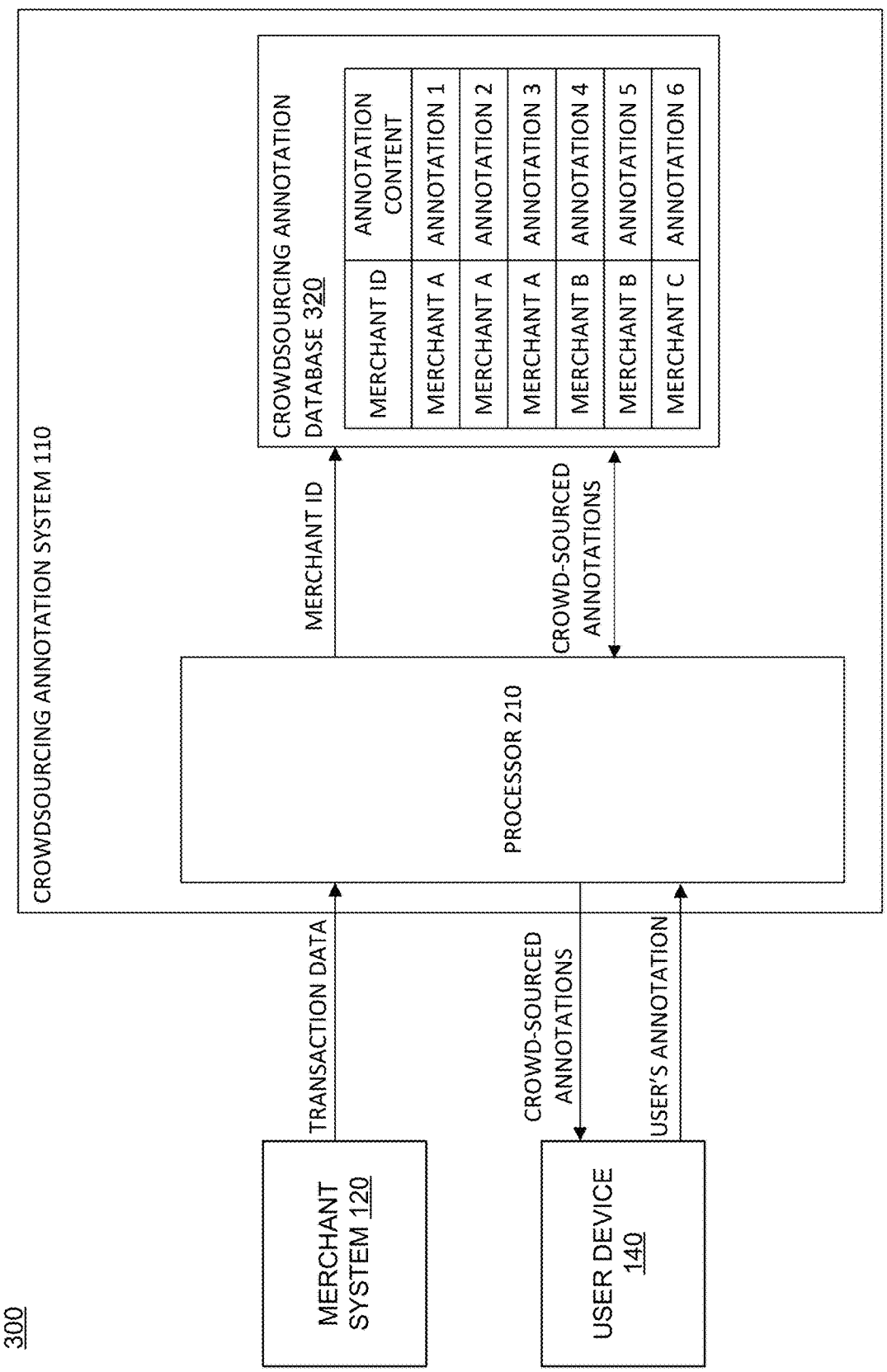
FIG. 3 is an example block diagram illustrating communications among the crowdsourcing annotation system, the merchant system, and the user device according to one aspect of the disclosed technology.

Referring to FIG. 3, the non-transitory computer readable medium 220 may include the crowdsourcing annotation database 320. The database 320 may store a plurality of crowdsourced annotations or tags associated with a plurality of merchants, such as Annotations 1-3 associated with Merchant A, Annotations 4-5 associated with Merchant B, and Annotation 6 associated with Merchant C. At least one of the crowdsourced annotations may include information associated with a merchant name, a merchant product, or a merchant location. For example, a merchant ID "DT #0656" may represent District Taco with a branch identifier #0656. "DT #0656" may be associated with one or more of the following annotations "District Taco," "Mexican Food," "Fast Food," "Eastern Market," "Capitol Hill," "Tacos" and "Lunch." Merchants in similar businesses may have similar annotations. For example, merchants in the food business, such as Sweetgreen, Da Hong Pao and Seamless, may have a common annotation "Lunch." The crowdsourced annotations may be shared among, and contributed by, a plurality of users. The users may belong to a community, such as a financial cardholder community. In one example, users registered with the same credit card company or the same bank may form a community where they can share annotations with each other. The crowdsourced annotations stored in the crowdsourcing annotation database 320 may be provided by the users based on their past transactions with merchants.

The non-transitory computer readable medium 220 may store any algorithm, such as machine learning algorithms, executable by the processor 210. The machine learning algorithm may include a classification model. Training data, such as training annotations related to training merchants, may be used for predicting one or more annotations for future merchants, based on a level similarity between the training merchants and the future merchants. The non-transitory computer readable medium 220 may store a predetermined similarity threshold. The non-transitory computer readable medium 220 may store a predetermined threshold to determine which annotation is appropriate or inappropriate.

In one embodiment, the crowdsourcing annotation system 110 may include a global model implemented on a server for sharing crowdsourced annotations among all or a subgroup of users of the community. The crowdsourced annotations may be based on behaviors, profiles, historical transactions, locations or demographic data of the users of the community or the subgroup. In another embodiment, the crowdsourcing system 110 may include a user-specific model implemented on the user device 140 such that annotations provided to the user are specifically tailored to the user's specific behavior, profile, historical transactions, or location.

Referring to the block diagram 300 as illustrated in FIG. 3, in one example, the crowdsourcing annotation system 110 may receive transaction data for a specific transaction from the merchant system 120, including but not limited to, the POS system 122, the merchant web portal 124 and the merchant app 126. The crowdsourcing annotation system 110 may determine a merchant identifier from the received transaction data, retrieve relevant crowd-sourced annotations, and provide the relevant crowdsourced annotations to a user for the user's consideration. The user may consider the relevant crowdsourced annotations and determine how to annotate the specific transaction. For example, the user may select one or more the relevant crowdsourced annotations to annotate the specific transaction. Alternatively, the user may create and submit a custom entry of annotation to annotate the specific transaction. The crowdsourcing annotation system 110 may analyze the custom entry of annotation to develop one or more crowdsourced annotations and add any new crowdsourced annotations into the crowdsourcing annotation database 320 for storage.

Figure 4:
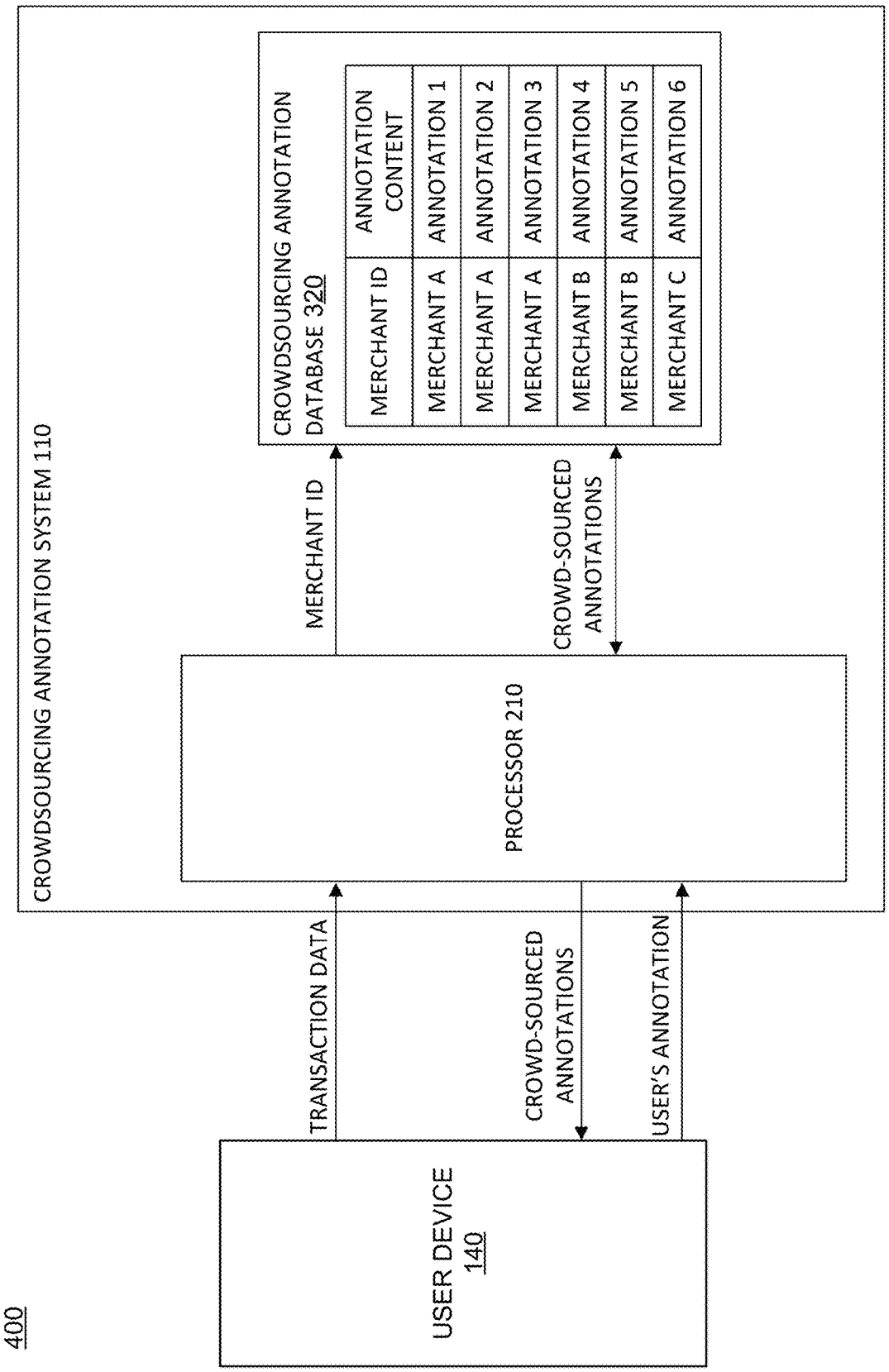
FIG. 4 is an example block diagram illustrating communications among the crowdsourcing annotation system and the user device according to one aspect of the disclosed technology.

Referring to the block diagram 400 as illustrated in FIG. 4, the crowdsourcing annotation system 110 may receive transaction data for a specific transaction from the user device 140. The crowdsourcing annotation system 110 may perform similar procedures as discussed above.

Figure 5:
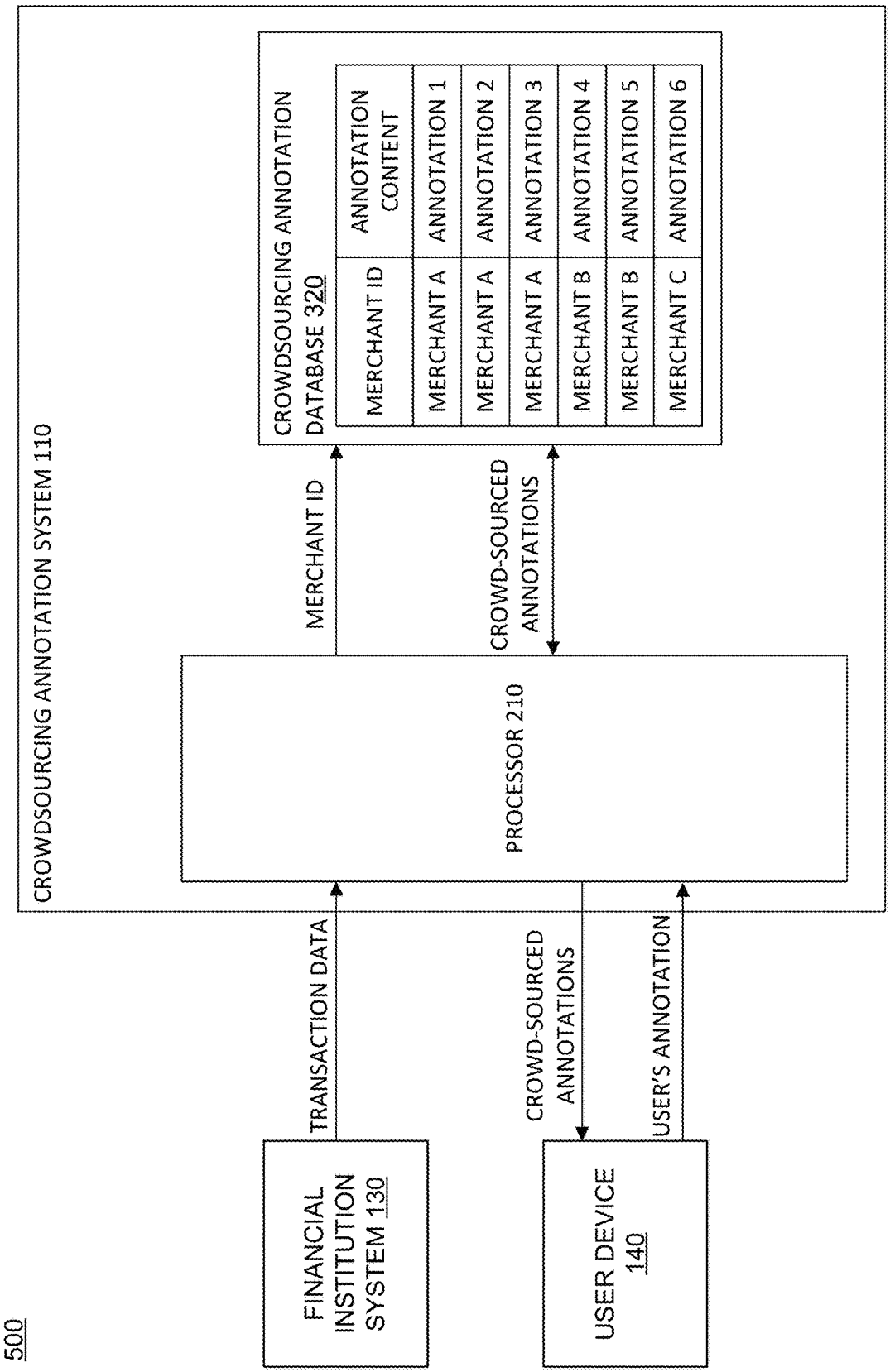
FIG. 5 is an example block diagram illustrating communications among the crowdsourcing annotation system, the financial institution system and the user device according to one aspect of the disclosed technology.

Further, as shown in the black diagram 500 of FIG. 5, the crowdsourcing annotation system 110 may receive transaction data for a specific transaction from the financial institution system 130, including but not limited to, the ATM machine 132, the bank branch 134, the bank web portal 136, and the bank app 138. The crowdsourcing annotation system 110 may perform similar procedures as discussed above.

In one example, as shown in FIG. 6, when a user makes a credit card purchase at District Taco branch location #0656, the user may receive on the user device 500 a notification 502 indicating that "Your credit card purchases for $20.90 at DT #0656 was approved." The crowdsourcing annotation system 110 may receive transaction data including merchant data, and transaction location data. The transaction location may be determined based on GPS data of the user device 140 at the time of the transaction. The crowdsourcing annotation system 110 may parse the received transaction data to identify the merchant. The crowdsourcing annotation system 110 may look up the crowdsourcing annotation database 320 to identify any relevant crowdsourced annotations 704 associated with the merchant. For any ambiguous merchant identifier or ambiguous merchant name, the crowdsourcing annotation system 110 may replace or supplement the ambiguous merchant identifier or merchant name with an accurate description based on one or more relevant crowdsourced annotations, provided that the one or more relevant crowdsourced annotations are sufficiently accurate.

As shown in FIG. 6, the crowdsourcing annotation system 110 may determine the merchant as DT #0656 located at Falls Church Va., 22042, U.S.A. The crowdsourcing annotation system 110 may invite the user to enter an annotation into an annotation entry 702 displayed on the user device 140. The crowdsourcing annotation system 110 may identify any relevant, predetermined auto-generated annotations. Any relevant crowdsourced annotations 704 associated with the merchant DT #0656 may be displayed on the user device 140 to be considered by the user. In this case, the crowdsourcing annotation system 110 may retrieve the following relevant crowdsourced annotations or tags 704: "District Taco," "Mexican Food," "Fast Food," "Eastern Market," "Capitol Hill," and "Tacos." The user may tap into a specific crowdsourced annotation and see a full list of merchants or transactions that have been annotated with the specific crowdsourced annotation.

The user may select any of the crowdsourced annotations 704 to describe the transaction. For example, the user may select "Fast Food" and "Eastern Market" from the list of relevant crowdsourced annotations as annotations for the $20.90 transaction. As a result, when the user searches for historical transactions using terms "Fast Food" or "Eastern Market," the $20.90 transaction is included in the search result.

The user may also click a button 706 to directly create any new crowdsourced annotation or tag and use the newly created annotation to describe the transaction. The user may also be given an option, as shown by a check box 708, to share any annotation entry with other users or users of a community.

Figure 8:
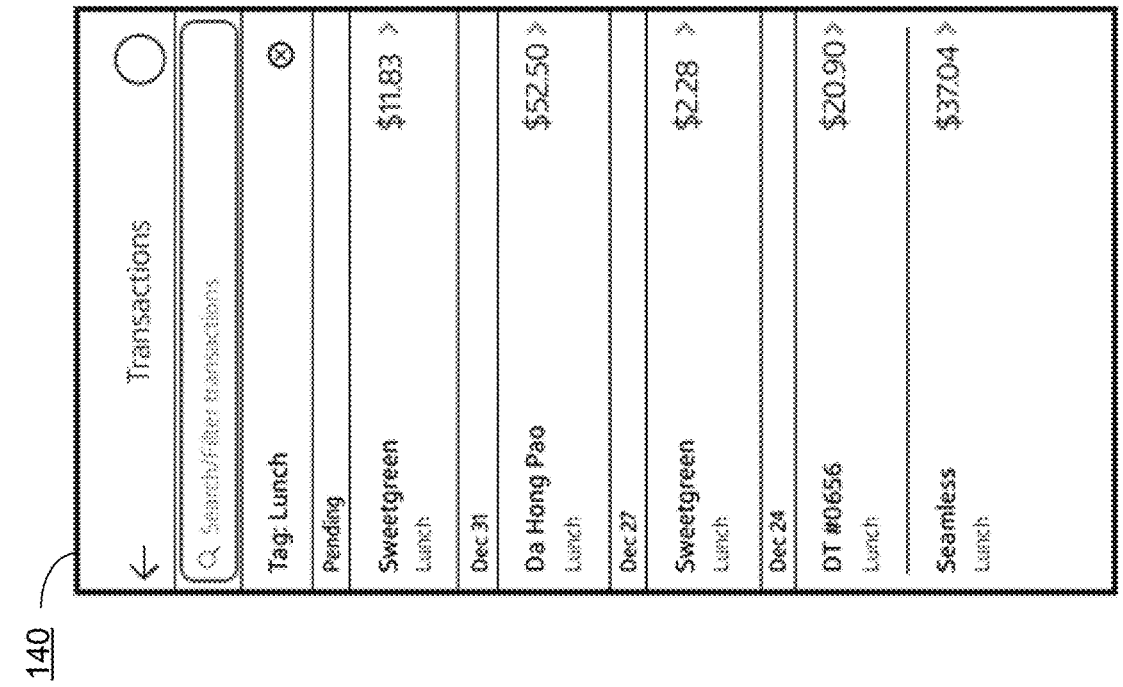
FIG. 8 is an example screenshot of the graphical user interface of the user device displaying the user's entry of an annotation according to one aspect of the disclosed technology.

As shown in FIG. 8, the user may create a user-defined annotation, such as "District Taco near Easter Market on Pennsylvanian Ave." The user may share the new annotation with other users by clicking the checkbox 708. Any annotation selected by the user from the relevant crowdsourced annotations may be displayed in an area 804. The user may tap into a specific annotation and see a full list of merchants or transactions that have been annotated with the specific annotation. The user may add any additional annotation or tag by clicking a button 806.

The processor 210 may parse the user-defined annotation using machine learning algorithms, and generate crowdsourced annotations based on the user-defined annotation. For example, the processor 210 may select key terms from the user-defined annotation. Each key term may be regarded as a component. For instance, the processor 210 may select terms such as "District Taco," "Easter Market" and "Pennsylvanian Ave" from the user-defined annotation "District Taco near Easter Market on Pennsylvanian Ave." The processor 210 may compare these new terms with existing crowdsourced annotations that are associated with the merchant DT #0656. In this case, 137 "District Taco" and "Easter Market" are existing crowdsourced annotations already associated with the merchant DT #0656, while "Pennsylvanian Ave" is a new term.

The processor 210 may determine whether any new term is an appropriate annotation before adding it into the crowdsourcing annotation database 320 as a crowdsourced annotation associated with the merchant. If the new term is not appropriate, then it is not added to the crowdsourcing annotation database 320 as a crowdsourced annotation. For example, when 1000 users previously annotated or tagged a restaurant merchant with a term "dinner", a new term in a completely different market such as "sporting goods" would be an inappropriate annotation and therefore discounted.

Here, the processor 210 may determine that the term "Pennsylvanian Ave" is an appropriate annotation for the merchant DT #0656. As a result, the processor 210 may add "Pennsylvanian Ave" into the crowdsourcing annotation database 320 as being associated with the merchant DT #0656, along with existing crowdsourced annotations that are associated with the same merchant.

Figure 9:
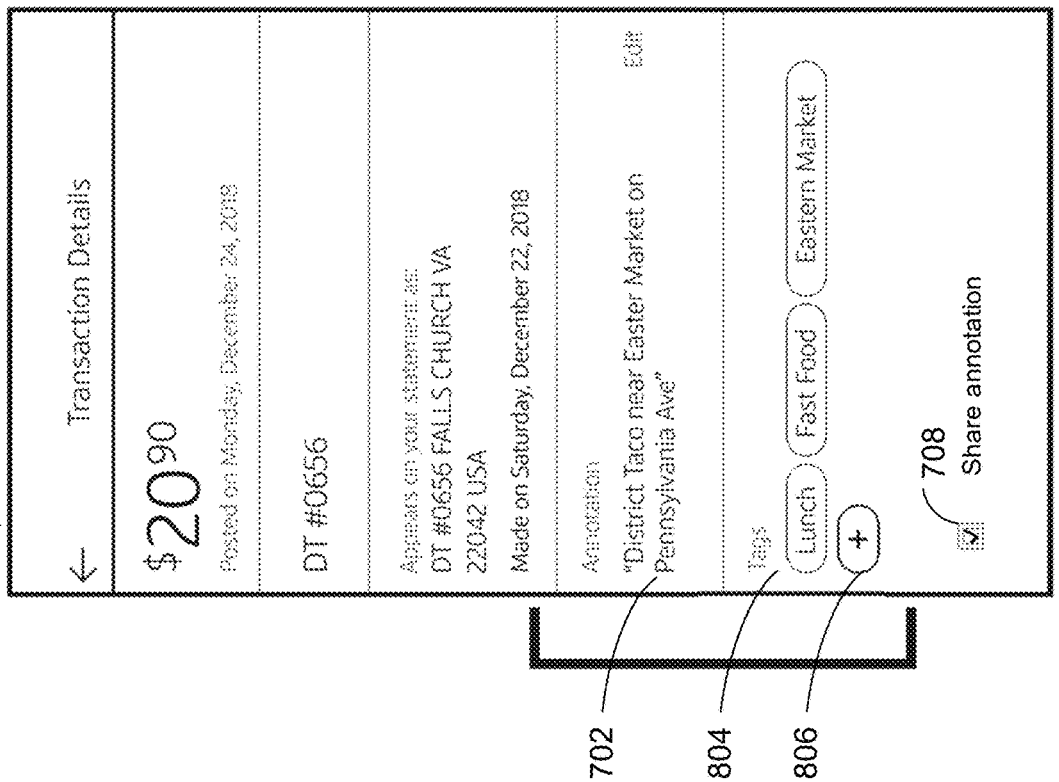
FIG. 9 is an example screenshot of the graphical user interface of the user device displaying historical transactions related to a specific annotation according to one aspect of the disclosed technology.

Referring to FIG. 9, the user can rely on annotations or tags to easily sort through transactions. For example, merchants in the food business, such as Sweetgreen, Da Hong Pao and Seamless, may have a common annotation "Lunch." The user can search for transactions associated with the same annotation or tag "Lunch." As shown in FIG. 9, all transactions associated with the same annotation are returned, so that the user may easily view expenses associated with a specific annotation.

Figure 10:
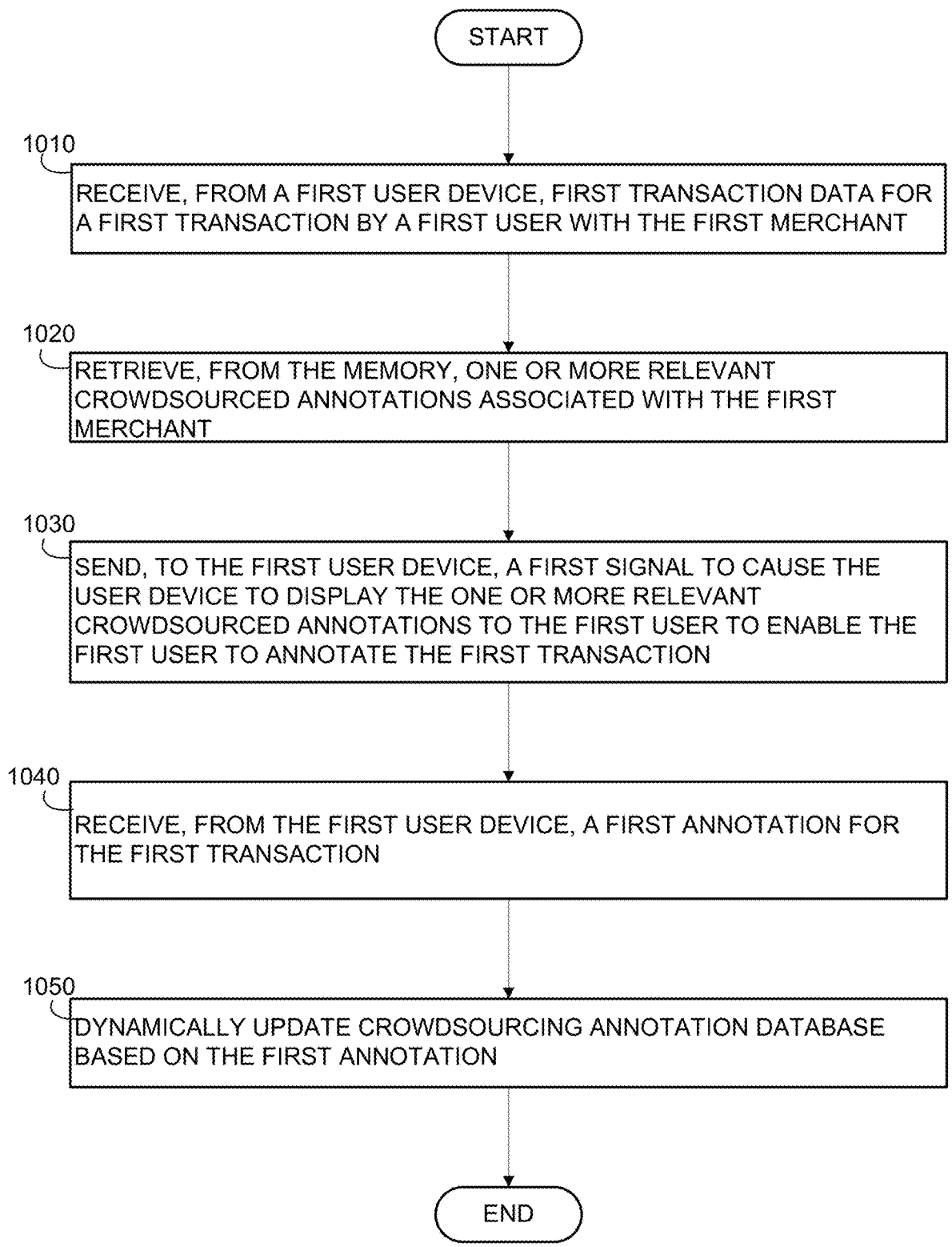
FIG. 10 is an example flow chart of a process performed by the crowdsourcing annotation system for updating crowdsourced annotations according to one aspect of the disclosed technology.

FIG. 10 illustrates an example flow chart of a crowdsourcing process performed by the crowdsourcing annotation system 110. The crowdsourcing annotation database 320 may store a plurality of crowdsourced annotations associated with a plurality of merchants, such as Annotations 1, 2 and 3 associated with a first merchant, such as DT #0656. At 1010, the processor 210 may receive, from a first user device 140, first transaction data for a first transaction by a first user with the first merchant. At 1020, the processor 210 may retrieve, from the crowdsourcing annotation database, one or more relevant crowdsourced annotations associated with the first merchant, such as annotations "District Taco," "Mexican Food," "Fast Food," "Eastern Market," "Capitol Hill" and "Tacos" associated with DT #0656. At 1030, the processor 210 may send, to the first user device 140, a first signal to cause the first user device 140 to display the one or more relevant crowdsourced annotations to the first user to enable the first user to annotate the first transaction. At 1040, the processor 210 may receive, from the first user device 140, a first annotation for the first transaction. The first annotation may include the first user's selection of the relevant crowdsourced annotation. In addition, or as alternative, the first annotation may include a custom note entered by the first user. The processor 210 may parse the custom note, such as "District Taco near Eastern Market on Pennsylvania Ave" entered by the first user into one or more terms or components, such as "District Taco", "Eastern Market," and "Pennsylvania Ave." The processor 210 may associate the one or more components or terms with the one or more relevant crowdsourced annotations. The processor 210 may store, in the crowdsourcing annotation database 320, the one or more components or terms as additional relevant crowdsourced annotations associated with the first merchant. In this case, since "District Taco" and "Eastern Market" already exist in the crowdsourcing annotation database 320 as being associated with DT #0656, the processor 210 may add "Pennsylvania Ave" as a new crowdsourced annotation associated with DT #0656 into the crowdsourcing annotation database 320.

At 1050, the processor 210 may dynamically update the crowdsourcing annotation database 320 based on the first annotation. The processor 210 may send, to the first user device 140, a second signal to cause the first user device 140 to display a confirmation message requesting the first user's approval to enter the first annotation into the crowdsourcing annotation database 320.

Further, the processor 210 may receive, from the first user device 140, second transaction data for a second transaction by the first user with the first merchant, such as DT #0656. The processor 210 may retrieve, from the crowdsourcing annotation database 320, one or more relevant crowdsourced annotations associated with the first merchant. The relevant crowdsourced annotations may include annotations discussed earlier "District Taco," "Mexican Food," "Fast Food," "Eastern Market," "Capitol Hill," "Tacos" as well as the latest annotation submitted by the first user, such as "Pennsylvania Ave." The processor 210 may send, to the first user device 140, a signal to cause the first user device 140 to display the one or more relevant crowdsourced annotations to the first user to enable the first user to annotate the second transaction. For example, the entire list of annotations associated with DT #0656, including "District Taco," "Mexican Food," "Fast Food," "Eastern Market," "Capitol Hill," "Tacos" and "Pennsylvania Ave" may be displayed to the first user. The processor 210 may receive, from the first user device 140, a second annotation for the second transaction. The processor 210 may dynamically update the crowdsourcing annotation database 320 based on the second annotation.

Furthermore, the processor 210 may receive, from a second user device 142, third transaction data for a third transaction by a second user with the first merchant, such as DT #0656. The processor 210 may retrieve, from the crowdsourcing annotation database 320, one or more relevant crowdsourced annotations associated with the first merchant, such as "District Taco," "Mexican Food," "Fast Food," "Eastern Market," "Capitol Hill," "Tacos" as well as the latest annotation submitted by the first user, such as "Pennsylvania Ave." The processor 210 may send, to the second user device 142, a signal to cause the second user device 142 to display the one or more relevant crowdsourced annotations to the second user to enable the second user to annotate the third transaction. The processor 210 may receive, from the second user device, an annotation for the third transaction. The processor 210 may dynamically update the crowdsourcing annotation database 320 based on the annotation received from the second user device 142.

Figure 11:
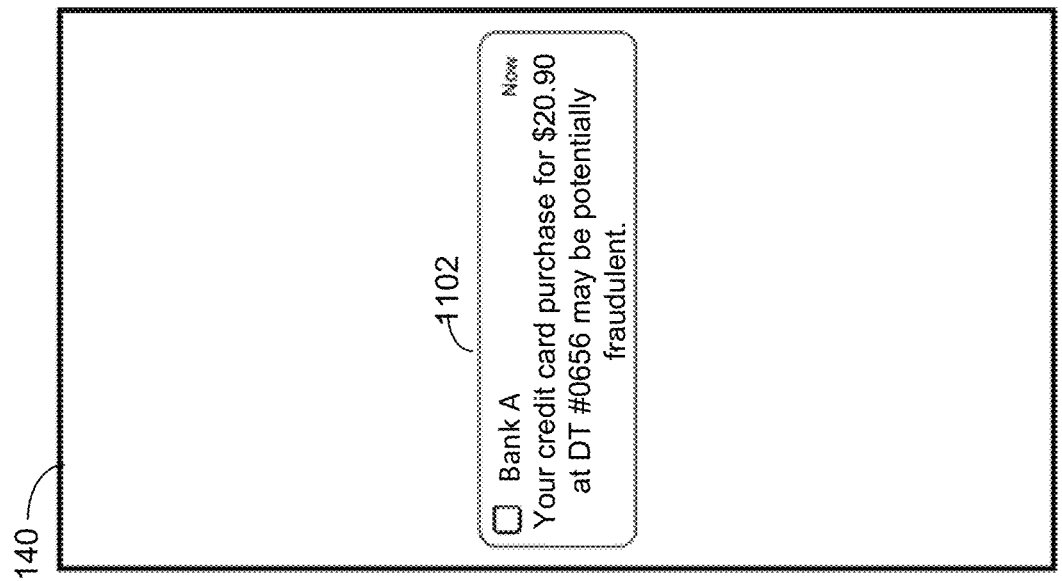
FIG. 11 is an example screenshot of the graphical user interface of the user device displaying a fraud notification according to one aspect of the disclosed technology.

Referring to FIG. 11, the crowdsourcing annotation system 110 may determine legitimacy of transaction data based on the crowdsourcing annotation database 320. For example, if the crowdsourcing annotation database 320 does not have any crowdsourced annotation related to a transaction or related to a merchant of the transaction, then the crowdsourcing annotation system 110 may determine that the transaction is potentially fraudulent. In another scenario, if one or more relevant crowdsourced annotations associated with a transaction or a merchant of the transaction indicate past fraudulent activities, then the transaction may also be annotated as potentially fraudulent. For any transaction annotated as potentially fraudulent, the user may receive a fraud alert as shown in FIG. 11.

Figure 12:
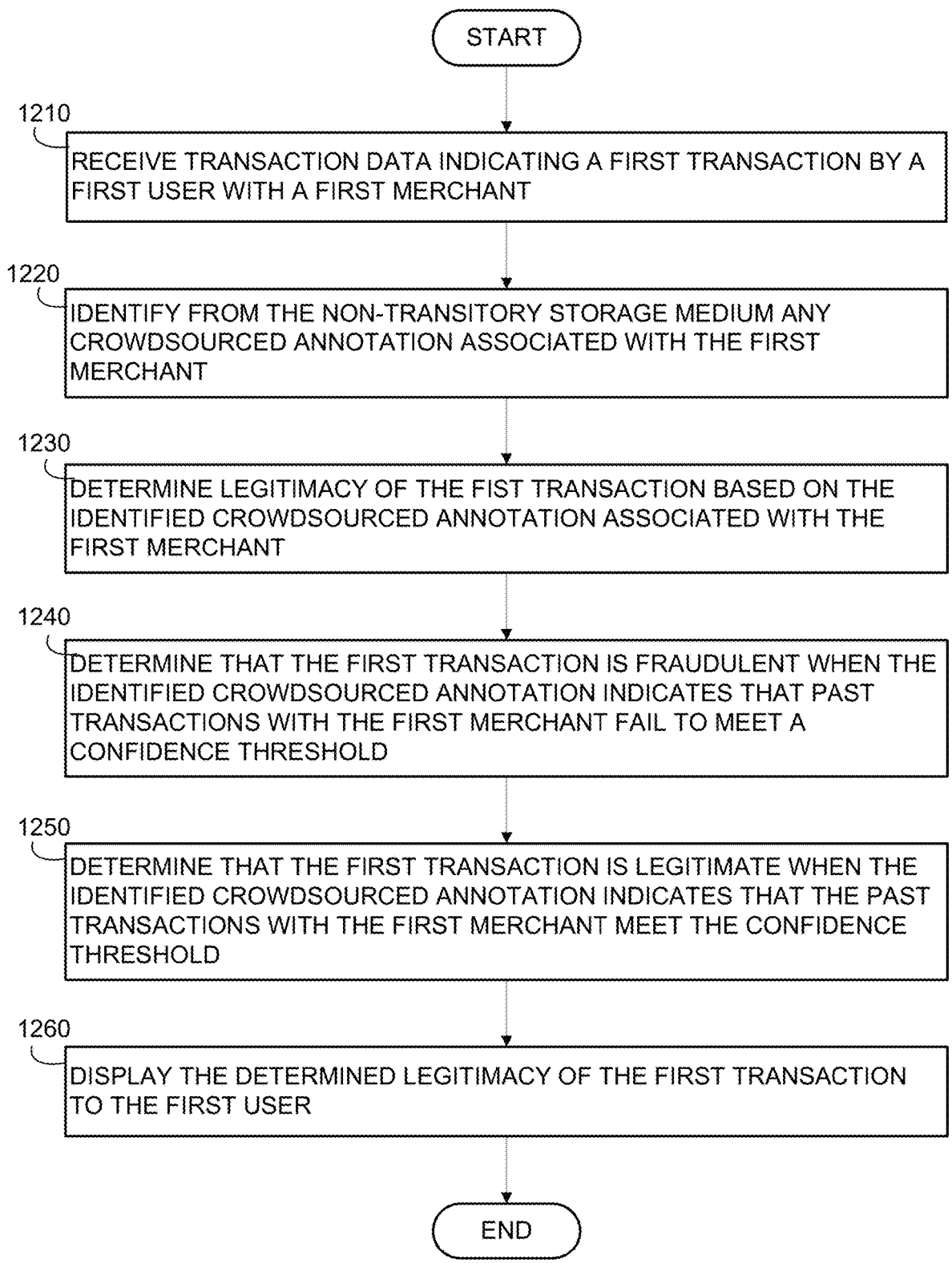
FIG. 12 is an example flow chart of a process performed by the crowdsourcing annotation system for detecting fraudulent transactions according to one aspect of the disclosed technology.

FIG. 12 illustrates an example flow chart of a process performed by the crowdsourcing annotation system 110 for detecting fraudulent transactions. At 1210, the processor 210 may receive transaction data indicating a first transaction by a first user with a first merchant, such as Merchant A. At 1220, the processor 210 may identify, from the crowdsourcing annotation database 320, any crowdsourced annotation associated with the first merchant, such as Annotations 1, 2 and 3 associated with Merchant A. At 1230, the processor 210 may determine legitimacy of the first transaction based on the identified crowdsourced annotation associated with the first merchant. For instance, the processor 210 may determine legitimacy of the first transaction based on Annotations 1, 2 and 3 associated with Merchant A. At 1240, the processor 210 may determine that the first transaction is fraudulent when the identified crowdsourced annotation indicates that past transactions with the first merchant fail to meet a confidence threshold. For instance, Annotations 1, 2 and 3 associated with Merchant A may indicate a low confidence level that is below the confidence threshold, suggesting that the first transaction is fraudulent. At 1250, the processor 210 may determine that the first transaction is legitimate when the identified crowdsourced annotation indicates that the past transactions with the first merchant meet the confidence threshold. For instance, Annotations 1, 2 and 3 associated with Merchant A may indicate a high confidence level that is above the confidence threshold, suggesting that the first transaction is legitimate. At 1260, the determined legitimacy of the first transaction may be displayed to the first user as shown in FIG. 11.

Further, the processor 210 may display an annotation option to the first user that invites the first user to annotate the first user's first transaction with the first merchant. The annotation option may include displaying the identified crowdsourced annotation to the first user for selection. The processor 210 may receive the first user's annotation with respect to the first user's first transaction with the first merchant. The processor 210 may dynamically update the crowdsourced annotations database 320 based on the first user's annotation.

Figure 13:
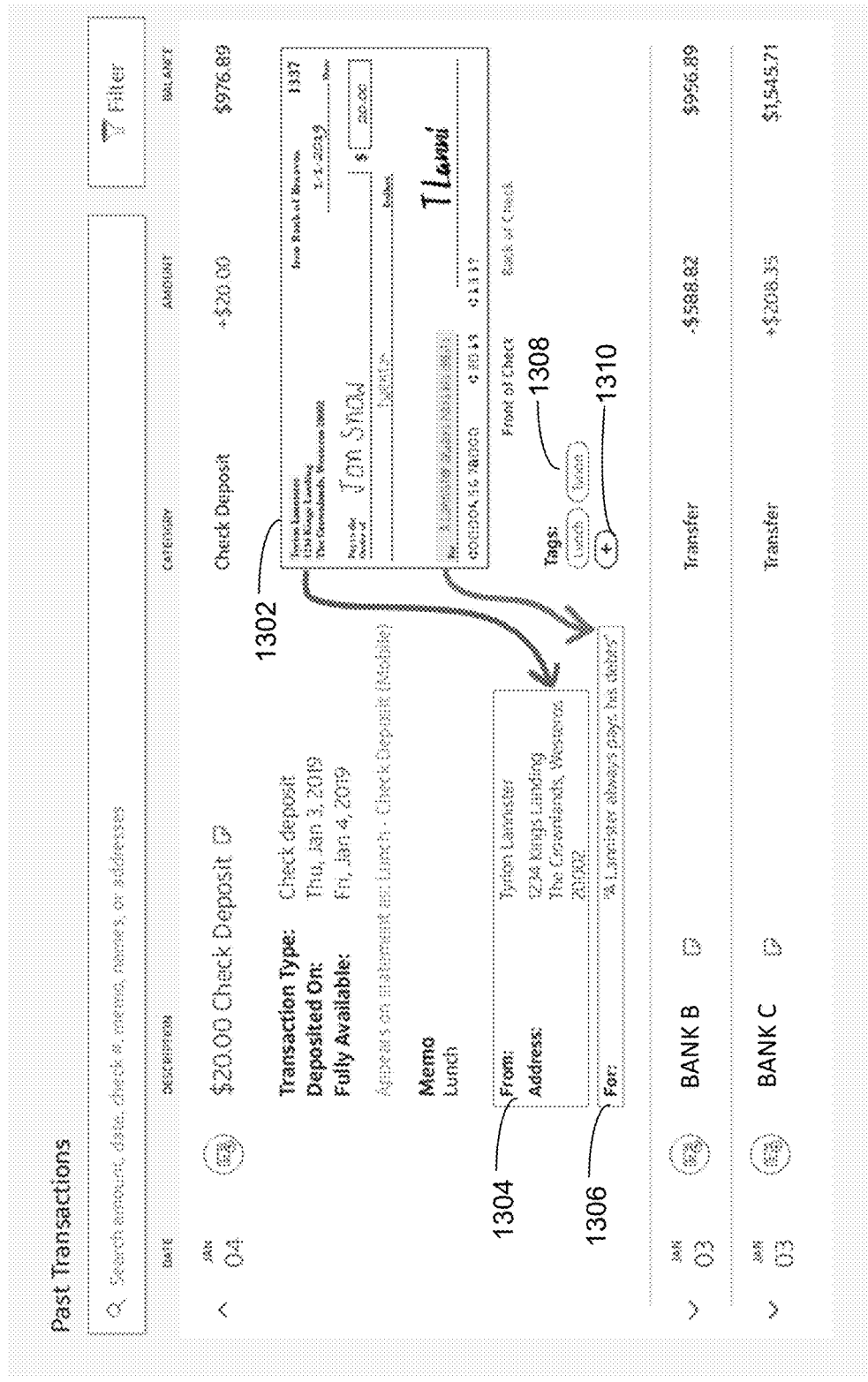
FIG. 13 is an example screenshot of the graphical user interface of the user device displaying annotations associated with a check according to one aspect of the disclosed technology.

In one aspect, the crowdsourcing annotation system 110 may leverage optical character recognition (OCR) to read text on checks, including names, addresses, memos and other text on the checks. The crowdsourcing annotation system 110 may provide the recognized text as meta data or recommended annotations or tags. By way of example, FIG. 13 illustrates a graphical user interface 1300 associated with the crowdsourcing annotation system 110. The crowdsourcing annotation system 110 may receive a check image 1302. Text on the check image 1302 may be recognized via the OCR. Payor name, payor's address and any memo may be automatically recognized from the check image 1320, and automatically populated into a payor field 1304 and a memo field 1306. The processor 210 may apply machine learning algorithms to the text identified from the check image 1302. In one embodiment, the processor 210 may search the crowdsourcing annotation database 320 for any relevant crowdsourced annotations associated with the identified text. For example, the processor 210 may identify a crowdsourced annotation "Tyrion" based on the payor name and/or payor address. The identified crowdsourced annotation "Tyrion" may be displayed to the user in an annotation area 1308 of the graphic user interface 1300. The user may select any identified crowdsourced annotation and use the identified crowdsourced annotation to annotate the check. Alternatively, the user may add any new annotation by clicking an insertion button 1310. The crowdsourcing annotation database 320 may be updated based on any annotation selected or added by the user. In some instances, the processor 210 may automatically generate one or more new annotations based on the text of the check image 1302. For example, the processor 210 may automatically create the annotation "Tyrion" based on the payor name and add the newly created annotation into the crowdsourcing annotation database 320. The user may search for past transactions by using an annotation. As shown in the diagram 1400 of FIG. 14, any past transaction associated with the annotation "tyrion" is returned.

Figure 15:
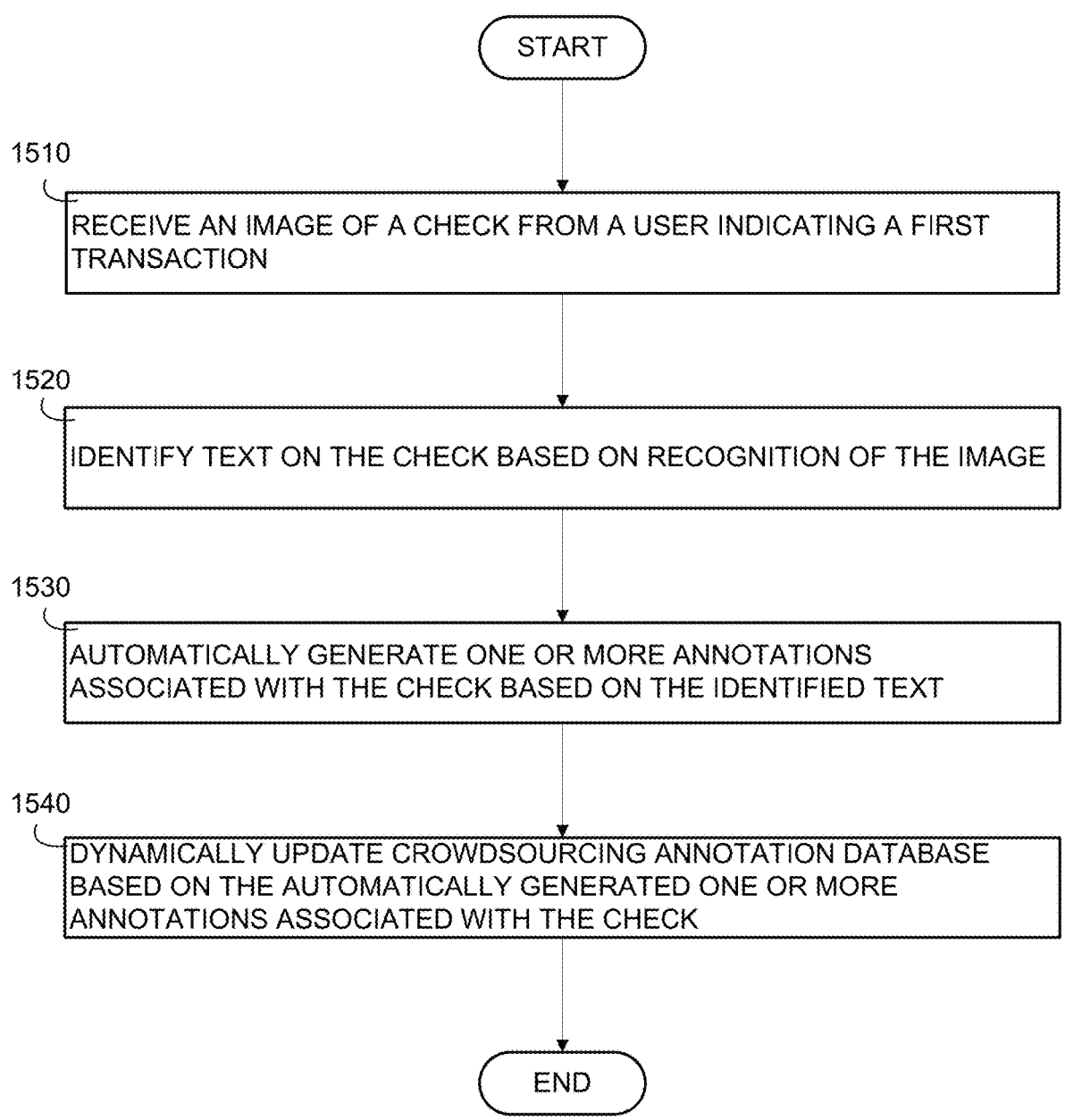
FIG. 15 is another example flow chart of a process performed by the crowdsourcing annotation system for updating crowdsourced annotations according to one aspect of the disclosed technology.

FIG. 15 illustrates an example flow chart of another crowdsourcing process performed by the crowdsourcing annotation system 110. At 1510, the processor 210 may receive an image of a check from a user indicating a first transaction. The user may provide the image of the check through the user device 140. Alternatively, the user may submit the check to the financial institution system 130, which transfers the check image to the crowdsourcing annotation system 110. At 1520, the processor 210 may identify text on the check based on recognition of the image. At 1530, the processor 210 may automatically generate one or more annotations associated with the check based on the identified text. At least one of the crowdsourced annotations may indicate information associated with payer, payee, transaction type, and transaction location.

At 1540, the processor 210 may dynamically update the crowdsourcing annotation database 320 based on the automatically generated one or more annotations associated with the check.

Further, the processor 210 may identify a payer associated with the first transaction from the text on the check. The processor 210 may display the identified payer on a graphical user interface to the user. The processor 210 may identify from the non-transitory storage medium 210 any crowdsourced annotation associated with the identified payer. The processor 210 may display an annotation option to the user that invites the user to annotate the check. The annotation option may include displaying the identified crowdsourced annotation to the user for selection.

Furthermore, the processor 210 may identify a memo associated with the first transaction from the text on the check; display the identified memo on a graphical user interface to the user; identify from the non-transitory storage medium any crowdsourced annotation associated with the identified memo; and display an annotation option to the user that invites the user to annotate the check, the annotation option including displaying the identified crowdsourced annotation to the user for selection.

The processor 210 may retrieve one or more past transactions associated with a crowdsourced annotation.

The processor 210 may display an annotation option to the user that invites the user to annotate the check, the annotation option including displaying the automatically generated one or more annotations associated with the check for selection; and dynamically update the crowdsourcing annotation database based on the user's annotation. In one embodiment, the user's annotation may include the user's selection of the automatically generated one or more annotations. In addition, or as alternative, the user's annotation may include a custom note entered by the user.

Turning back to FIG. 2, each crowdsourcing annotation system 110 may include one or more physical or logical devices (e.g., servers). For example, the crowdsourcing annotation system 110 may be a single device or server or may be configured as a distributed computer system including multiple servers, devices, or computers that interoperate to perform one or more of the processes and functionalities associated with the disclosed embodiments. In some embodiments, the crowdsourcing annotation system 110 may further include a peripheral interface, a transceiver, a mobile network interface in communication with the processor 210, a bus configured to facilitate communication between the various components of the crowdsourcing annotation system 110, and a power source configured to power one or more components of the crowdsourcing annotation system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 224. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the crowdsourcing annotation system 110. For example, the crowdsourcing annotation system 110 may access one or more remote programs 226, that, when executed, perform functions related to disclosed embodiments.

The crowdsourcing annotation system 110 may also include one or more I/O devices 260 that may comprise one or more interfaces for receiving signals or input from devices and providing signals or output to one or more devices that allow data to be received and/or transmitted by the crowdsourcing annotation system 110. For example, the crowdsourcing annotation system 110 may include interface components, which may provide interfaces to one or more input devices, such as one or more keyboards, mouse devices, touch screens, track pads, trackballs, scroll wheels, digital cameras, microphones, sensors, and the like, that enable the crowdsourcing annotation system 110 to receive data from one or more users. The crowdsourcing annotation system 110 may include a display, a screen, a touchpad, or the like for displaying images, videos, data, or other information. The I/O devices 260 may include the graphical user interface 262.

In exemplary embodiments of the disclosed technology, the crowdsourcing annotation system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 150 may include a network of interconnected computing devices more commonly referred to as the internet. The network 150 may be of any suitable type, including individual connections via the internet such as cellular or WiFi networks. In some embodiments, the network 150 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 150 may comprise any type of computer networking arrangement used to exchange data. For example, the network 150 may be the Internet, a private data network, virtual private network using a public network, and/or other suitable connection(s) that enables components in system environment 100 to send and receive information between the components of system 100. The network 150 may also include a public switched telephone network ("PSTN") and/or a wireless network. The network 150 may also include local network that comprises any type of computer networking arrangement used to exchange data in a localized area, such as WiFi, Bluetooth™ Ethernet, and other suitable network connections that enable components of system environment 100 to interact with one another.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for crowdsourcing annotations for transactions, comprising:
   one or more processors; and
   memory, including:
      a crowdsourcing annotation database storing a plurality of crowdsourced annotations associated with a plurality of merchants, the crowdsourced annotations being shared among, and contributed by, a plurality of users, the crowdsourced annotations including a plurality of annotations associated with a first merchant obtained from past transactions with the first merchant; and
      instructions that, when executed by the one or more processors, cause the one or more processors to:
         receive training data comprising one or more training annotations associated with a plurality of training merchants, with a first training annotation of the one or more training annotations being associated with a first training merchant of the plurality of training merchants;
         receive, from a first user device, first transaction data for a first transaction by a first user with the first merchant, the first transaction data comprising a merchant identifier associated with the first merchant;
         identify the first merchant based on the merchant identifier;
         determine, by the processor, one or more relevant crowdsourced annotations associated with the first merchant by:
            determining whether the first merchant exceeds a threshold of similarity to the first training merchant by comparing the first transaction data to the one or more training annotations;
            associating at least the first training annotation with the first merchant when the first merchant exceeds the threshold of similarity to the first training merchant;
         generating a first graphical user interface including a suggestion for the first user to annotate the first transaction with the one or more training annotations;
         transmit a first signal to the first user device to display the generated first graphical user interface to the first user;
         receive, from the first user device, a first annotation for the first transaction;
         dynamically update the crowdsourcing annotation database based on the first annotation; and
         automatically update the first graphical user interface to display any past transactions associated with the first annotation.

2. The system of claim 1, wherein the first annotation includes a selection by the first user of the relevant crowdsourced annotation.

3. The system of claim 1, wherein the first annotation includes a custom note entered by the first user.

4. The system of claim 3, wherein the instructions further cause the one or more processors to:
   parse the custom note entered by the first user into one or more terms;
   associate the one or more terms with the first merchant; and
   store, in the crowdsourcing annotation database, the one or more terms as additional relevant crowdsourced annotations associated with the first merchant.

5. The system of claim 1, wherein the instructions further cause the one or more processors to:
   send, to the first user device, a second signal to cause the first user device to display a confirmation message requesting an approval by the first user to enter the first annotation into the crowdsourcing annotation database.

6. The system of claim 1, wherein the instructions further cause the one or more processors to:
   determine a legitimacy of the first transaction data based on the one or more relevant crowdsourced annotations.

7. The system of claim 1, wherein at least one of the plurality of crowdsourced annotations includes information associated with a merchant name, a merchant product, or a merchant location.

8. The system of claim 1, wherein the instructions further cause the one or more processors to:
   receive, from the first user device, second transaction data for a second transaction by the first user with the first merchant;
   determine, by the processor, one or more relevant crowdsourced annotations associated with the first merchant by:
      determining whether the first merchant exceeds a threshold of similarity to the first training merchant by comparing the second transaction data to the one or more training annotations;
      associating at least the first training annotation with the first merchant when the first merchant exceeds the threshold of similarity to the first training merchant;
      generating a second graphical user interface including a suggestion for the first user to annotate the second transaction with the one or more training annotations;
   transmit a second signal to the first user device to display the generated second graphical user interface to the first user;
   receive, from the first user device, a second annotation for the second transaction; and
   dynamically update the crowdsourcing annotation database based on the second annotation.

9. The system of claim 1, wherein the instructions further cause the one or more processors to:
   receive, from a second user device, third transaction data for a third transaction by a second user with the first merchant;
   determine, by the processor, one or more relevant crowdsourced annotations associated with the first merchant by:
      determining whether the first merchant exceeds a threshold of similarity to the first training merchant by comparing the third transaction data to the one or more training annotations;
      associating at least the first training annotation with the first merchant when the first merchant exceeds the threshold of similarity to the first training merchant;
      generating a third graphical user interface including a suggestion for the second user to annotate the third transaction with the one or more training annotations;
   transmit a third signal to the second user device to display the generated third graphical user interface to the first user;

receive, from the second user device, an annotation for the third transaction; and dynamically update the crowdsourcing annotation database based on the annotation received from the second user device.

10. A system for detecting fraud transactions based on crowdsourced annotations, comprising:

a non-transitory storage medium for storing a plurality of crowdsourced annotations associated with a plurality of merchants obtained from past transactions with the merchants, the crowdsourced annotations being shared among and contributed by a plurality of users; and a processor configured to:

receive first transaction data indicating a first transaction by a first user with a first merchant and first transaction location data indicating a location of the first transaction based on a first user device GPS signal associated with the first user, the first transaction data comprising a first merchant identifier;

identify from the non-transitory storage medium any crowdsourced annotation associated with the first merchant based on the first merchant identifier;

determine legitimacy of the first transaction by determining whether the location of the first transaction corresponds to a location of a previous transaction within a confidence threshold, wherein the previous transaction is associated with the first merchant identifier;

determine that the first transaction is fraudulent when the location of the first transaction does not correspond to the location of the previous transaction within the confidence threshold;

determine that the first transaction is legitimate when the location of the first transaction corresponds to the location of the previous transaction within the confidence threshold;

generate a first graphical user interface including an indication of the determined legitimacy;

transmit a first signal to a first user device associated with the first user to display the generated first graphical user interface to the first user;

receive a first annotation for the first transaction that has been determined to be legitimate;

dynamically update the crowdsourcing annotation database based on the first annotation; and automatically update the first graphical user interface to display any past transactions associated with the first annotation.

11. The system of claim 10, wherein the processor is further configured to:

display an annotation option to the first user that invites the first user to annotate the first transaction with the first merchant, the annotation option including displaying a crowdsourced annotation to the first user for selection based on the first merchant identifier;

receive an annotation from the first user associated with the first transaction; and dynamically update the non-transitory storage medium based on the annotation.

12. The system of claim 11, wherein the annotation includes a selection of the crowdsourced annotation.

13. The system of claim 11, wherein the annotation includes an entry of a custom note by the first user.

14. A system for crowdsourcing annotations for transactions, comprising:

a non-transitory storage medium for including a crowdsourcing annotation database, the crowdsourcing annotation database storing a plurality of crowdsourced annotations associated with a plurality of transactions, the crowdsourced annotations being shared among and contributed by a plurality of users; and a processor configured to:

receive first transaction data comprising one or more annotations associated with a plurality of transactions between one or more users and a first merchant and a first merchant identifier associated with the first merchant;

receive second transaction data comprising a second transaction between a first user and the first merchant from a first user device associated with the first user;

determine that the first transaction data exceeds a threshold of similarity to the second transaction;

generate a first graphical user interface including at least one of the one or more annotations associated with the first merchant identifier;

transmit a first signal to the first user device to display the generated first graphical user interface;

receive a first annotation for the first transaction data from the first user device;

dynamically update the crowdsourcing annotation database based on the first annotation; and automatically update the first graphical user interface to display any past transactions associated with the first annotation.

15. The system of claim 14, wherein the processor configured to:

display an annotation option to the first user that invites the first user to annotate the second transaction, the annotation option including displaying a crowdsourced annotation to the user for selection.

16. The system of claim 15, wherein the processor configured to:

receive, from the first user device, a new annotation associated with the second transaction; and dynamically update the crowdsourcing annotation database based on the new annotation.

17. The system of claim 14, wherein the processor configured to retrieve one or more past transactions associated with a crowdsourced annotation.

18. The system of claim 16, wherein the processor configured to:

automatically generate one or more additional annotations based on the new annotation; and transmit to the first user device the one or more additional annotations.

19. The system of claim 18, wherein a selected annotation includes the selection of the first user of one of the automatically generated additional annotations.

20. The system of claim 19, wherein the selected annotation includes a custom note entered by the first user.

\* \* \* \* \*